(12) United States Patent
Huber

(10) Patent No.: US 7,649,724 B2
(45) Date of Patent: Jan. 19, 2010

(54) PROTECTIVE CIRCUIT FOR A CONVERTER

(75) Inventor: Norbert Huber, Teisendorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 420 days.

(21) Appl. No.: 11/748,977

(22) Filed: May 15, 2007

(65) Prior Publication Data

US 2007/0274017 A1    Nov. 29, 2007

(30) Foreign Application Priority Data

May 23, 2006    (DE)    ........................ 10 2006 024 018

(51) Int. Cl.
*H02H 3/08*    (2006.01)
*H02H 9/02*    (2006.01)
(52) U.S. Cl. ........................... 361/93.1; 361/24; 363/55
(58) Field of Classification Search ................... 363/50, 363/51, 55, 56.03, 56.1, 56.07; 361/18, 24, 361/93.1, 93.8, 103
See application file for complete search history.

(56) References Cited

U.S. PATENT DOCUMENTS

| | | | |
|---|---|---|---|
| 4,980,624 A | | 12/1990 | Bernhardt |
| 5,402,045 A | * | 3/1995 | Mori ........................... 318/757 |
| 5,936,820 A | * | 8/1999 | Umemura et al. ........... 361/103 |
| 6,917,179 B2 | * | 7/2005 | Komatsu et al. ............ 318/700 |
| 7,336,455 B2 | * | 2/2008 | Dimino et al. ................ 361/24 |
| 7,342,763 B2 | * | 3/2008 | Mladenik et al. ............ 361/119 |
| 7,355,826 B2 | * | 4/2008 | Ochiai et al. ................. 361/23 |
| 2003/0002309 A1 | * | 1/2003 | Furukawa et al. ........... 363/132 |
| 2006/0181829 A1 | * | 8/2006 | Nadipuram et al. ........ 361/93.1 |

FOREIGN PATENT DOCUMENTS

| | | |
|---|---|---|
| DE | 10 2004 022 005 | 1/2005 |
| EP | 0 247 996 | 12/1987 |
| EP | 1 650 621 | 4/2006 |
| GB | 1 330 131 | 9/1973 |

OTHER PUBLICATIONS

Search Report, European Patent Application No. 07 00 2247, dated Nov. 16, 2007 (translated).

* cited by examiner

*Primary Examiner*—Adolf Berhane
*Assistant Examiner*—Matthew Grubb
(74) *Attorney, Agent, or Firm*—Kenyon & Kenyon LLP

(57) ABSTRACT

In a protective circuit for a converter having a plurality of phases, for each phase current of the phases, a signal proportional to the respective phase current is applied to a transformer circuit that, below and in the area of a limiting frequency, functions as a low-pass filter with the limiting frequency, and above the limiting frequency, functions as a divider. The outputs of the transformer circuit are applied to a maximum generator for forming the absolute value maximum. This maximum is fed to a comparator in which the maximum is compared to a reference value.

11 Claims, 4 Drawing Sheets

PROTECTIVE CIRCUIT FOR A CONVERTER

CROSS-REFERENCE TO RELATED APPLICATIONS

The present application claims priority to Application No. 10 2006 024 018.9, filed in the Federal Republic of Germany on May 23, 2006, which is expressly incorporated herein in its entirety by reference thereto.

FIELD OF THE INVENTION

The present application relates to a protective circuit for a converter. The protective circuit may be used to safeguard the converter, or also a motor connected to it, from being destroyed due to thermal overload.

BACKGROUND INFORMATION

Electric motors and their control electronics (converters) are often operated at the limit of their working capacity in order to obtain a maximum of efficiency with the given expenditure (weight, volume, costs). In so doing, it is important not to overheat the electric motor and its converter. If the temperature climbs above a certain limiting value, then either the insulation of the windings of the electric motor or even the power semiconductors in the converter are affected detrimentally. This leads immediately, or perhaps only after a certain time, to the destruction of the motor or its control electronics.

Certain conventional devices make it possible to monitor the temperature of the windings of an electric motor, or the temperature of the power semiconductors in the converter. If the temperature climbs above a limiting value, the output of the motor can be reduced, and damage avoided.

Such temperature monitoring may be performed using a temperature sensor. However, temperature sensors exhibit a certain lag, so that a motor or converter can be destroyed by short, strong current spikes even before a temperature sensor responds. In addition, the temperature sensor does not sit directly on the chips of the power semiconductors, so that their actual barrier-junction temperature cannot be measured.

Certain conventional devices make do without a temperature sensor. For operating an electric motor, often the current flowing in the respective motor phases is measured using a current sensor. If the internal resistance of the motor phases or of the power semiconductors is known, based on the currents measured, it is possible to calculate the power loss in the windings or in the power semiconductors. The specific temperature can then be inferred using a thermal model. By setting a limit for the energy loss produced per time interval, the motor and its control electronics may be protected reliably from overheating.

Such a device is described in greater detail in German Published Patent Application No. 10 2004 022 005. In the model described therein, it is taken into account that during a standstill of the motor or at very low rotational frequencies, the maximum currents allowed in each phase are markedly lower than at higher rotational frequencies. However, the model used can only be implemented easily in those converters which are able to furnish a certain computing power.

SUMMARY

Example embodiments of the present invention provide a protective circuit for a converter that is particularly easy to implement, and that takes into account the different limiting values for the phase currents of the converter at various rotational frequencies.

A protective circuit is described below for a converter having several phases, in which, for each phase current, a signal proportional to the respective phase current is applied to a transformer circuit that, below and in the area of a limiting frequency, functions as a low-pass filter with the limiting frequency, and above the limiting frequency, functions as a divider. The outputs of these transformer circuits are fed to a maximum generator for forming the absolute value maximum. This maximum is fed to a comparator, in which the maximum is compared to a reference value.

If the maximum is above the reference value, the comparator generates a signal that, for example, may be used as a shut-off signal for shutting off the converter.

Although the protective circuit can be provided using quite simple electronics, it is able to evaluate the phase currents as a function of their frequency (and therefore as a function of the rotational frequency of the motor which matches the frequency of the phase currents to within one factor). Thanks to the low-pass effect of the transformer circuit, for quite low frequencies below the limiting frequency, the signals proportional to the phase currents are supplied undiminished to the maximum generator, while above the limiting frequency, the signals proportional to the phase currents are reduced (attenuated) by a certain ratio. If the transformer circuit is suitably configured, then it is provided that at high frequencies above the limiting frequency, considerably higher maximum phase currents are allowed than at frequencies below the limiting frequency. In this context, typically the limiting frequency is at a few hertz, e.g., at approximately 3 Hz.

According to an example embodiment of the present invention, a protective circuit for a converter having a plurality of phases includes: a transformer circuit corresponding each phase, a signal proportional to a phase current of each phase appliable to a respective transformer circuit, each transformer circuit configured to function, below and in an area of a limiting frequency, as a low-pass filter with the limiting frequency and to function, above the limiting frequency, as a divider; a maximum generator connected to outputs of the transformer circuits and configured to form an absolute value maximum of the outputs of the transformer circuits; and a comparator configured to compare the absolute value maximum of the outputs of the transformer circuits to a reference value.

The comparator may be configured to generate a shut-off signal if an output of the maximum generator is above the reference value.

A value proportional to a temperature and which lowers the reference value may be feedable to the comparator.

The value proportional to the temperature may correspond to a temperature of components in the converter.

The value proportional to the temperature may correspond to a temperature of power semiconductors in the converter.

The value proportional to the temperature may correspond to a temperature in a motor connected to the converter.

The value proportional to the temperature may correspond to a winding temperature in a motor connected to the converter.

The converter may be operable with a PWM frequency, and a value proportional to the PWM frequency and which lowers the reference value may be feedable to the comparator.

The transformer circuit may include a frequency-dependent series circuit including a first resistor, a capacitor and a second resistor. The output of the transformer circuit may be arranged between the first resistor and the capacitor, and the series circuit may be configured to function, below and in the area of the limiting frequency, as the low pass filter with the limiting frequency, and may be configured to function, above the limiting frequency, as a divider.

The series circuit may include a series connection of the first resistor to the capacitor and of the capacitor to the second resistor.

According to an example embodiment of the present invention, a protective circuit for a converter having a plurality of phases includes: transformer circuit means corresponding each phase, a signal proportional to a phase current of each phase appliable to a respective transformer circuit means, each transformer circuit means functioning, below and in an area of a limiting frequency, as low-pass filtering means with the limiting frequency and functioning, above the limiting frequency, as dividing means; maximum generating means connected to outputs of the transformer circuit means and forming an absolute value maximum of the outputs of the transformer circuit means; and comparing means for comparing the absolute value maximum of the outputs of the transformer circuit means to a reference value.

Further features and aspects of example embodiments of the present invention are described in more detail below with reference to the appended Figures.

DETAILED DESCRIPTION

Figure 1A:
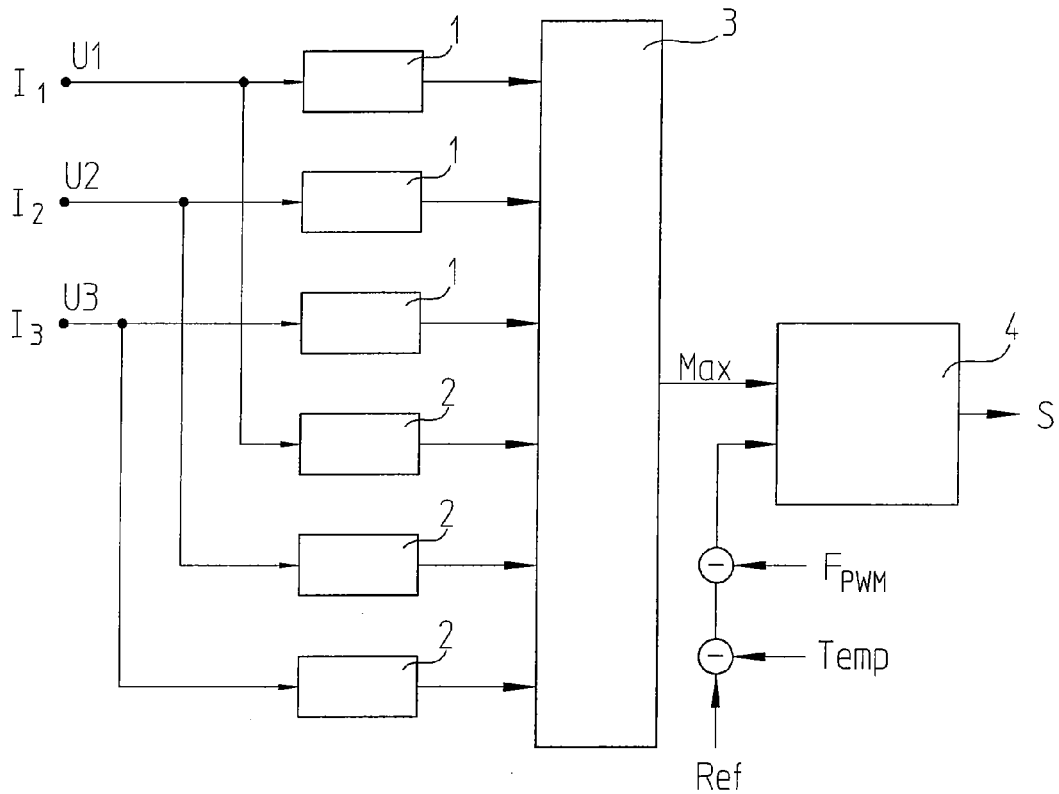
FIG. 1a is a schematic view of a protective circuit.

FIG. 1a schematically illustrates a protective circuit for a converter. Signals U1, U2, U3 proportional to phase currents I1, I2, I3 are applied to its input. For example, these signals U1, U2, U3 may be ascertained by current sensors which generate voltages proportional to phase currents I1, I2, I3.

Each of signals U1, U2, U3 is fed concurrently to a low-pass filter 1 and a divider 2. Therefore, in each case, a low-pass filter 1 and a divider 2 together form a transformer circuit.

All low-pass filters 1 and dividers 2 are connected on their output sides to a maximum generator 3 which, from all the outputs, ascertains the largest absolute value as maximum Max, and forwards it to a comparator 4. Since at frequencies below a limiting frequency, low-pass filters 1 forward proportional signals U1, U2, U3 undiminished, while dividers 2, also in this range, reduce proportional signals U1, U2, U3 according to their divider ratio, the parallel connection of one low pass filter 1 and one divider 2 each functions as a low pass filter in the range of low frequencies with respect to the maximum generation in maximum generator 3. At frequencies markedly above the limiting frequency of the low pass filter, proportional signals U1, U2, U3 are very strongly attenuated, so that dividers 2 are effective with respect to the maximum generation in maximum generator 3. If one looks upon the parallel connection of low pass filter 1 and divider 2 as a transformer circuit, then with regard to the maximum generation, it therefore functions as a low-pass filter below and in the area of a limiting frequency, and as a divider above the limiting frequency.

Comparator 4 compares maximum Max to a reference value Ref. As soon as the maximum is above the reference value, comparator 4 emits a shut-off signal S which, for example, may be used to shut off the converter, or also to reduce the power output by the converter, so that there is a drop below reference value Ref.

Reference value Ref may also be reduced by a value Temp proportional to a temperature. For example, this temperature may be the temperature of the power semiconductors in the converter or of their heat sinks. The temperature of a motor connected to the converter, or of the coils of such a motor may also be utilized. Thus, it may be taken into account that the maximum allowed phase current I1, I2, I3 is also a function of the temperature already reached in the converter or in the associated motor.

In addition, reference value Ref may also be reduced by a value $F_{PWM}$ proportional to the PWM frequency (with which the converter is operated), since the higher this PWM frequency, the higher the switching losses resulting in the power semiconductors of the converter. Because the power semiconductors in the converter heat up faster at higher PWM frequencies, a reduced reference value Ref is therefore sensible.

By consideration both of the temperature already reached as well as the PWM frequency, a maximum high limiting value may be taken into account in comparator 4 at any time. Otherwise, this limiting value would have to be planned for the worst case, thus, for example, for semiconductor switches that are already operated close to the limiting temperature with high PWM frequency.

Figure 1B:
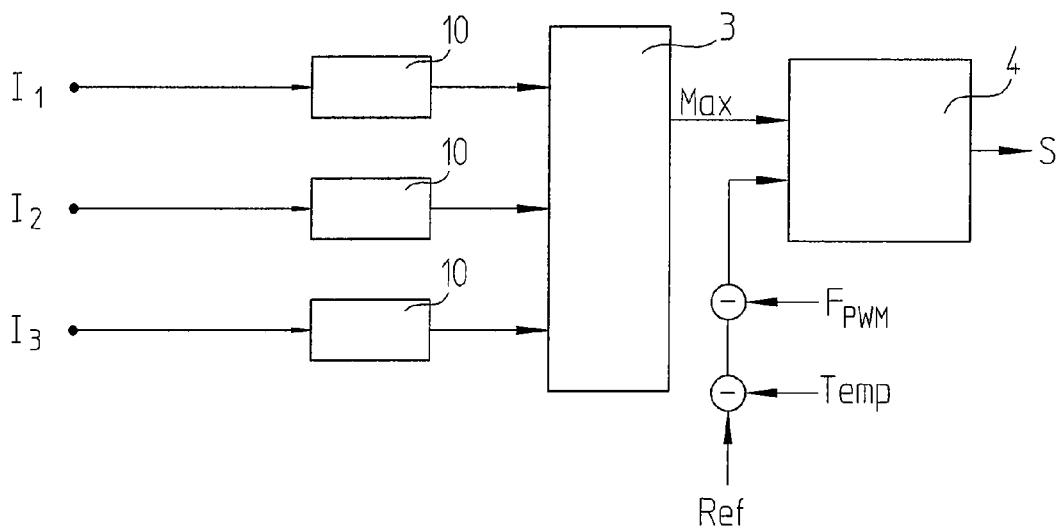
FIG. 1b is a schematic view of a simplified protective circuit.

The protective circuit may also be simplified, as illustrated in FIG. 1b. A low-pass filter 1 and a divider 2 are combined in a single transformer circuit 10. For low frequencies below and in the area of the limiting frequency mentioned above, this transformer circuit 10 functions as a low-pass filter 1 with precisely this limiting frequency, but as a divider 2 for high frequencies clearly above the limiting frequency. For each protective circuit illustrated in FIGS. 1a and 1b, a possible implementation from the standpoint of circuit engineering is described below with reference to, e.g., FIGS. 3 and 4.

Figure 2:
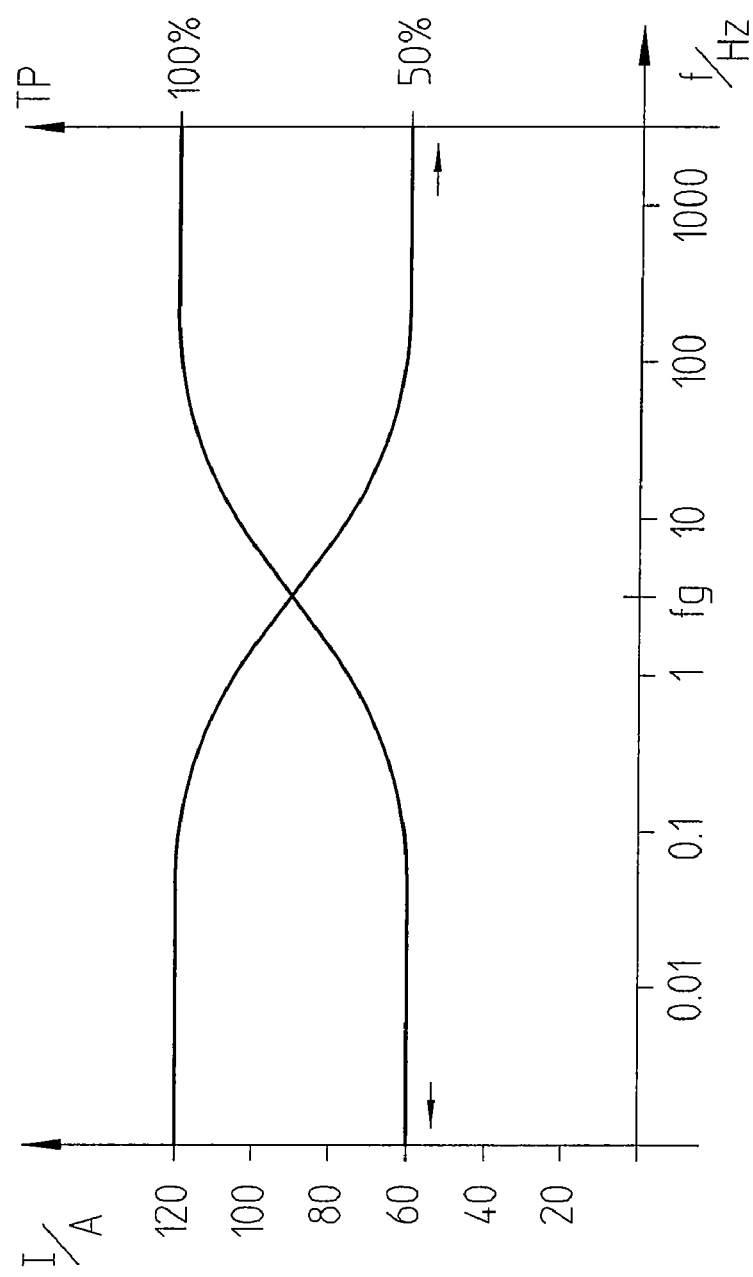
FIG. 2 illustrates frequency-dependent maximum currents and a transfer function of the transformer circuit.

FIG. 2 illustrates the characteristic of current I maximally allowed in a phase, as a function of the frequency of phase current I1, I2, I3. As illustrated in FIG. 2, it can be seen that markedly below a limiting frequency fg, only a certain portion (e.g., 60 A) of current I is allowed that is possible (e.g., 120 A) markedly above limiting frequency fg. As mentioned above, this is because at high frequencies, the load of all phases is approximately equal, while at low frequencies or even at standstill of the motor under load, there is a very uneven distribution of the thermal losses in the individual power semiconductors of the converter or in the motor phases. In the example illustrated, there is approximately a factor of two between the two limiting values. This factor is dependent on the boundary conditions (number of phases, power semiconductors used, etc.), but the example relates to a three-phase converter, and is well-suited to clarify the principle of the protective circuit.

Low-pass filter 1 or transformer circuit 10 is arranged such that there is a limiting frequency which corresponds approximately to limiting frequency fg of the current characteristic illustrated. Markedly below limiting frequency fg, transformer circuit 10, in the manner of a low pass filter, lets 100% of proportional signal U1, U2, U3 through, as transfer function TP in FIG. 2 illustrates. Markedly above limiting frequency fg, this value is constant at approximately 50%, corresponding to a divider ratio of 1:2. As indicated, below and in the area of limiting frequency fg, transformer circuit 10 functions as low-pass filter 1 with limiting frequency fg, and above limiting frequency fg, functions as divider with divider ratio 1:2.

In the example illustrated in FIG. 2, it is possible to set reference value Ref to, e.g., 60 A. Phase currents I1, I2, I3 of more than 60 A with a frequency clearly below limiting frequency fg (e.g., less than 0.1 Hz) lead to a shut-off signal S, since corresponding signal U1, U2, U3 arrives unattenuated in maximum generator 3. At higher frequencies (e.g., from and above 100 Hz), higher currents up to 120 A are also allowed, since signals U1, U2, U3 proportional to phase currents I1, I2, I3 reach maximum generator 3 reduced only by the factor 2 due to the dividing action.

It should be understood from this description that the divider ratio of the transformer circuit for high frequencies should correspond approximately to the ratio between the allowed currents at low and high frequencies.

Figure 3:
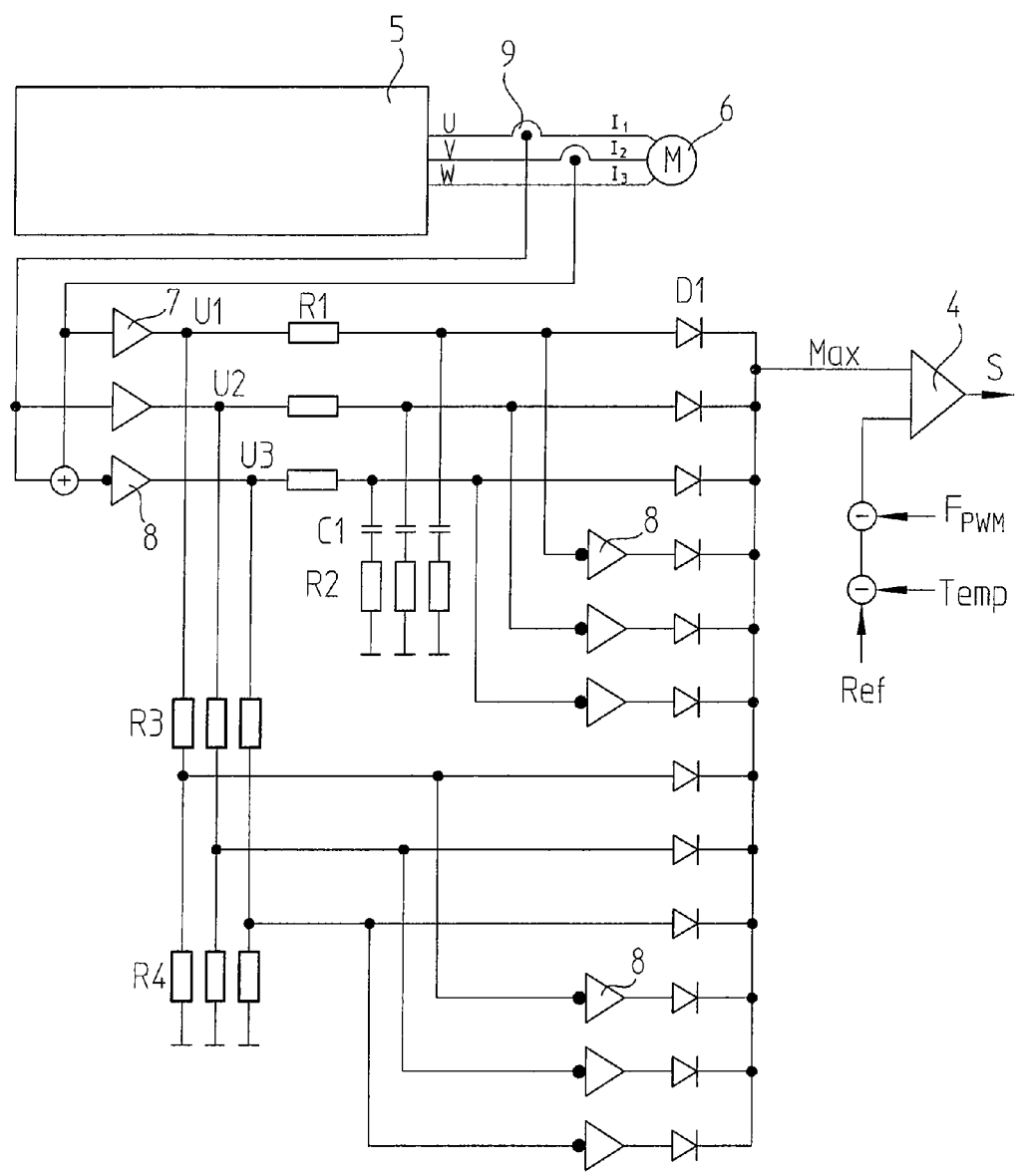
FIG. 3 is a schematic view of a protective circuit.

FIG. 3 schematically illustrates an example embodiment of a protective circuit, such as that illustrated in FIG. 1a. A converter 5 supplies three phases U, V, W of a motor 6 with phase currents I1, I2, I3. This current is detected via current sensors 9.

In the circuit illustrated in FIG. 3, use is made of the fact that the sum of phase currents I1, I2, I3 must always be zero, and only two of the three phase currents are measured by current sensors 9. The third phase current is the sum of the two other, multiplied by −1. This is taken into account in that the signals of the two current sensors 9 are supplied to amplifier circuits 7 for forming proportional signals U1, U2, while the sum of the two sensor signals is supplied to an inverting amplifier circuit 8 for forming proportional signal U3.

The outputs of these three amplifier circuits 7, 8 are in each case supplied to a low pass filter formed of a series connection of a resistor R1, a capacitor C1 and a resistor R2, as well as to a divider formed of a resistor R3 and a resistor R4. The interconnection of these components is illustrated in FIG. 3.

The outputs of low passes R1, C1, R2 and of dividers R3, R4 connected directly to diodes D1, and via inverting amplifiers 8 with amplification factor 1 to further diodes D1. Thus, by the interconnection of all outputs of diodes D1, a maximum generator 3 is formed which supplies the absolute value maximum Max of all low passes filters R1, C1, R2 and dividers R3, R4 to comparator 4 (e.g., a comparator circuit). As described with respect to FIG. 1a, a reference value Ref, reduced by a value Temp proportional to a temperature and by a value $F_{PWM}$ proportional to the PWM frequency of converter 5, is applied to the second input of comparator 4. If maximum Max is above a limiting value, e.g., reference value Ref thus reduced, comparator 4 generates a shut-off signal S.

The circuit illustrated in FIG. 3 includes three low passes R1, C1, R2, three dividers R3, R4 and six inverting amplifier circuits 8.

If proportional signals U1, U2, U3 are inverted directly, then three inverting amplifier circuits 8 are sufficient, but in each case six low passes R1, C1, R2 and dividers R3, R4 are needed.

Figure 4:
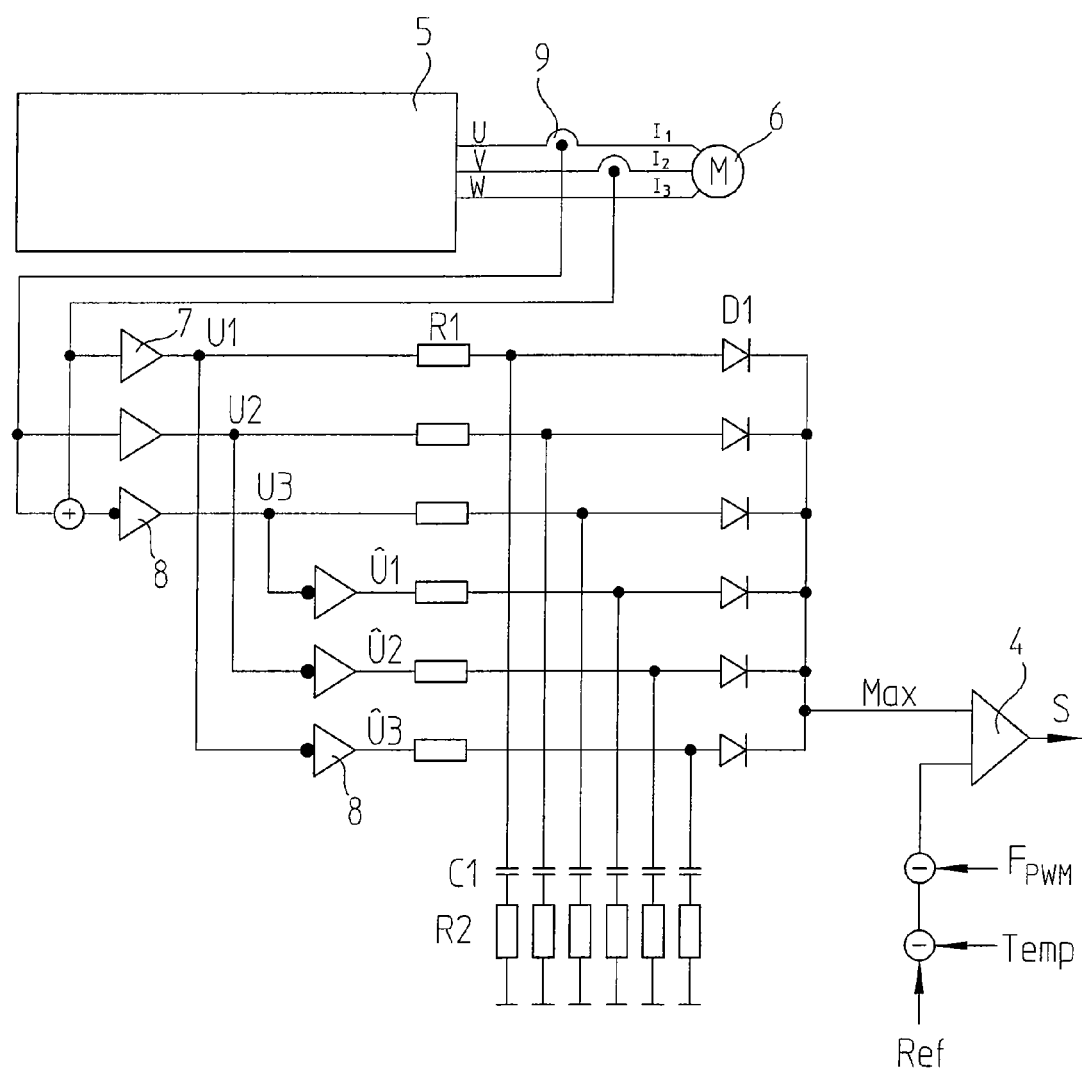
FIG. 4 is a schematic view of a protective circuit.

FIG. 4 illustrates a substantially simplified protective circuit. As illustrated in FIG. 4, proportional signals U1, U2, U3 are inverted in three Inverting amplifiers 8. The six signals U1, U2, U3, Û1, Û2, Û3 thus obtained are supplied to six transformer circuits 10. By suitable dimensioning of components R1, C1, R2 of the low pass filter illustrated in FIG. 3, it alone is able to function as transformer circuit 10. By giving the same value of, e.g., 10 kOhm to both resistors R1, R2, and by providing capacitor C1 with, for example, 8.2 μF, a transfer function TP as illustrated in FIG. 2 is obtained for transformer circuit 10. As mentioned with referenced to FIG. 3, the outputs of all transformer circuits 10 are fed via diodes D1 to a comparator 4 which compares the maximum Max thus formed to a reference value Ref reduced as described above, and generates a shut-off signal S if maximum Max is above this limiting value or reduced reference value Ref.

Using the protective circuits described above, an effective protection of converter 5 or motor 6 from thermal overload becomes possible in a simple manner.

What is claimed is:

1. A protective circuit for a converter having a plurality of phases, comprising:

a transformation circuit corresponding each phase, a signal proportional to a phase current of each phase appliable to a respective transformation circuit, each transformer circuit configured to function, below or equal to a limiting frequency, as a low-pass filter with the limiting frequency and to function, above the limiting frequency, as a divider;

a maximum generator connected to outputs of the transformation circuits and configured to form an absolute value maximum of the outputs of the transformation circuits; and a comparator configured to compare the absolute value maximum of the outputs of the transformation circuits to a reference value.

2. The protective circuit according to claim 1, wherein the comparator is configured to generate a shut-off signal if an output of the maximum generator is above the reference value.

3. The protective circuit according to claim 1, wherein a value proportional to a temperature and which lowers the reference value is feedable to the comparator.

4. The protective circuit according to claim 3, wherein the value proportional to the temperature corresponds to a temperature of components in the converter.

5. The protective circuit according to claim 3, wherein the value proportional to the temperature corresponds to a temperature of power semiconductors in the converter.

6. The protective circuit according to claim 3, wherein the value proportional to the temperature corresponds to a temperature in a motor connected to the converter.

7. The protective circuit according to claim 3, wherein the value proportional to the temperature corresponds to a winding temperature in a motor connected to the converter.

8. The protective circuit according to claim 1, wherein the converter is operable with a PWM frequency, and a value proportional to the PWM frequency and which lowers the reference value is feedable to the comparator.

9. The protective circuit according to claim 1, wherein the transformation circuit includes a frequency-dependent series circuit including a first resistor, a capacitor and a second resistor, the output of the transformation circuit arranged between the first resistor and the capacitor, the series circuit configured to function, below and in the area of the limiting frequency, as the low pass filter with the limiting frequency, and configured to function, above the limiting frequency, as a divider.

10. The protective circuit according to claim 9, wherein the series circuit includes a series connection of the first resistor to the capacitor and of the capacitor to the second resistor.

11. A protective circuit for a converter having a plurality of phases, comprising:

transformation circuit means corresponding each phase, a signal proportional to a phase current of each phase appliable to a respective transformer circuit means, each transformation circuit means functioning, below or equal to a limiting frequency, as low-pass filtering means with the limiting frequency and functioning, above the limiting frequency, as dividing means;

maximum generating means connected to outputs of the transformation circuit means and forming an absolute value maximum of the outputs of the transformation circuit means; and comparing means for comparing the absolute value maximum of the outputs of the transformation circuit means to a reference value.

* * * * *